(12) United States Patent
Malwitz

(10) Patent No.: US 7,842,127 B2
(45) Date of Patent: Nov. 30, 2010

(54) CORROSION INHIBITOR COMPOSITION COMPRISING A BUILT-IN INTENSIFIER

(75) Inventor: Mark A. Malwitz, Richmond, TX (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/612,770

(22) Filed: Dec. 19, 2006

(65) Prior Publication Data

US 2008/0146464 A1 Jun. 19, 2008

(51) Int. Cl.
*C23F 11/00* (2006.01)
*C23F 11/04* (2006.01)

(52) U.S. Cl. .............. 106/14.44; 106/14.05; 106/14.41; 106/14.42; 252/387; 252/388; 252/389.1; 422/7; 510/255; 510/258

(58) Field of Classification Search .............. 106/14.05, 106/14.41, 14.42, 14.44; 252/387, 388, 389.1; 422/7; 510/255, 258
See application file for complete search history.

(56) References Cited

U.S. PATENT DOCUMENTS

| | | | |
|---|---|---|---|
| 3,773,465 A | 11/1973 | Keeney et al. | |
| 4,141,416 A | 2/1979 | Holm | |
| 4,498,997 A | 2/1985 | Walker | |
| 4,734,259 A | 3/1988 | Frenier et al. | |
| 4,871,024 A | 10/1989 | Cizek | |
| 4,871,848 A | 10/1989 | Treybig et al. | |
| H751 H | 3/1990 | Sullivan et al. | |
| 4,997,040 A | 3/1991 | Cizek | |
| 5,002,673 A | 3/1991 | Williams et al. | |
| 5,013,483 A | 5/1991 | Frenier et al. | |
| 5,089,153 A | 2/1992 | Williams et al. | |
| 5,130,034 A | 7/1992 | Williams et al. | |
| 5,200,096 A | 4/1993 | Williams et al. | |
| 5,209,859 A | 5/1993 | Williams et al. | |
| 5,543,388 A | 8/1996 | Williams et al. | |
| 5,697,443 A | 12/1997 | Brezinski et al. | |
| 6,180,057 B1 * | 1/2001 | Taylor et al. | 422/16 |
| 6,511,613 B1 | 1/2003 | Cizek et al. | |
| 7,216,710 B2 * | 5/2007 | Welton et al. | 166/307 |
| 2005/0189113 A1 * | 9/2005 | Cassidy et al. | 166/307 |
| 2006/0186380 A1 * | 8/2006 | Walker | 252/392 |
| 2006/0201676 A1 * | 9/2006 | Cassidy et al. | 166/307 |
| 2006/0205609 A1 * | 9/2006 | Cassidy et al. | 507/240 |
| 2006/0264335 A1 * | 11/2006 | Penna et al. | 507/244 |
| 2007/0010404 A1 * | 1/2007 | Welton et al. | 507/267 |
| 2007/0069182 A1 * | 3/2007 | Cassidy et al. | 252/387 |
| 2007/0071887 A1 * | 3/2007 | Cassidy et al. | 427/97.7 |
| 2007/0187648 A1 * | 8/2007 | Welton et al. | 252/389.22 |

FOREIGN PATENT DOCUMENTS

EP 869258 A1 * 10/1998
WO WO94/04645 A1 * 3/1994

* cited by examiner

*Primary Examiner*—Anthony J Green
(74) *Attorney, Agent, or Firm*—Edward O. Yonter; Michael B. Martin

(57) ABSTRACT

A corrosion inhibitor composition comprising one or more organic solvents, one or more corrosion inhibitor intermediates and about 0.1 to about 20 weight percent of one or more iodide salts dissolved in said composition and methods of using the corrosion inhibitor composition in acid fracturing and matrix acid stimulation of subterranean formations.

19 Claims, No Drawings

CORROSION INHIBITOR COMPOSITION COMPRISING A BUILT-IN INTENSIFIER

TECHNICAL FIELD

This invention relates generally to corrosion inhibitors and more specifically to the use of corrosion inhibitor compositions comprising iodide salts for extending the effectiveness of acid corrosion inhibitors, particularly in oil field acidizing operations.

BACKGROUND OF THE INVENTION

Acids and acid solutions have long been used in the stimulation of oil wells, gas wells, water wells, and similar boreholes. Acid stimulation is performed in wells completed in subterranean formations. Acid stimulation is used in conjunction with hydraulic fracturing techniques and matrix acid stimulation techniques. In both acid fracturing and matrix acid stimulation, the well treating acid solutions, usually HCl or mixtures of HCl and HF, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor, frequently referred to as ACI's.

In order to extend the effectiveness of the acid corrosion inhibitors, the literature suggests the use of additives, including the metal salts of iodide and chloride as disclosed in U.S. Pat. Nos. 3,773,465; 4,871,024; 4,997,040; 3,773,465.

One of the problems encountered in using the ionizable salts is that they are not compatible with organic based corrosion inhibitor formulations. For example, it is generally understood that metal chlorides or iodide salts are not soluble in the organic liquids used in corrosion inhibitor formulations. Therefore, metal chloride or iodide salt intensifiers must be formulated separately and used in combination with organic based corrosion inhibitors. Use of these so-called "external intensifiers" therefore results in increased on-site formulation, handling, transport and application costs.

SUMMARY OF THE INVENTION

In an embodiment, this invention is a corrosion inhibitor composition comprising one or more organic solvents, one or more corrosion inhibitor intermediates; and about 0.5 to about 20 weight percent of one or more iodide salts dissolved in said composition.

In another embodiment, this invention is a method of inhibiting corrosion of a steel surface in contact with an acidic fluid comprising contacting the steel surface with an acid solution comprising aqueous acid and an effective corrosion inhibiting amount of a corrosion inhibitor composition comprising one or more organic solvents, one or more corrosion inhibitor intermediates and about 0.1 to about 20 weight percent of one or more iodide salts dissolved in said composition.

In another embodiment, this invention is a method of treating a subterranean formation penetrated by a wellbore comprising pumping through well tubular goods and injecting into the formation an effective treating amount of an acid solution comprising aqueous acid and an amount of a corrosion inhibitor composition comprising one or more organic solvents, one or more corrosion inhibitor intermediates and about 0.1 to about 20 weight percent of one or more iodide salts dissolved in said composition effective to inhibit the corrosion of metallic surfaces of said well tubular goods in contact with said acid solution.

In another embodiment, this invention is a method of preparing an acid solution which provides enhanced protection against corrosion of metallic surfaces in contact with said solution comprising mixing an aqueous acid solution with an effective corrosion inhibiting amount of the corrosion inhibitor composition comprising one or more organic solvents, one or more corrosion inhibitor intermediates and about 0.1 to about 20 weight percent of one or more iodide salts dissolved in said composition.

This invention therefore provides ACI compositions in which the intensifier is formulated into the composition, thereby eliminating or reducing the need for external intensifiers.

DETAILED DESCRIPTION OF THE INVENTION

The corrosion inhibitor composition of this invention comprises one or more organic solvents, one or more corrosion inhibitor intermediates and one or more iodide salts. Each of these components, as well as the acid solution in which they are used, are described below.

Suitable iodide salts include any organic or inorganic iodide salts which can be dissolved in the organic solvent/corrosion inhibitor mixture and which are capable of generating an effective corrosion inhibiting amount of iodide under use conditions.

Iodide salts suitable for use in a corrosion inhibitor composition according to this invention may be empirically selected based on the cationic portion of the iodide salt, the other ingredients (in particular the types of solvents) used in the inhibitor formulation, and the amount of iodide salt desired in the finished composition.

In an embodiment, the iodide salts are selected from lithium iodide, sodium iodide, potassium iodide, calcium iodide, magnesium iodide, ammonium iodide, tetraethylammonium iodide, tetrapropylammonium iodide, tetrabutylammonium iodide, tetrapentylammonium iodide, tetrahexylammonium iodide, tetraheptylammonium iodide, tetraphenylammonium iodide, phenytrimethylammonium iodide and (ethyl)triphenylphosphonium iodide.

In another embodiment, the iodide salts are selected from lithium iodide, phenyltrimethylammonium iodide, (ethyl)triphenylphosphonium iodide, tetrabutylammonium iodide, tetraethylammonium iodide, tetrapropylammonium iodide and ammonium iodide.

In another embodiment, the iodide salt is ammonium iodide.

Any acid corrosion inhibitor intermediates known in the art and derivatives thereof may be used in the corrosion inhibitor composition. These include the acetylenic alcohols, quaternary amine compounds, unsaturated aldehydes, amines, and Mannich reaction products of aromatic nitrogen compounds, monoamines and aldehydes. These ACI components are described below.

Acetylenic alcohols employed in the present invention typically have formula:

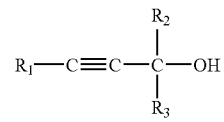

where $R_1$, $R_2$ and $R_3$ are independently hydrogen, alkyl groups having 1 to 18 carbon atoms, naphthyl, phenyl, and alkyl substituted phenyls having 1 to 10 carbon atoms in the alkyl substituent. Representative acetylenic alcohols include methyl butynol, methyl pentynol, ethyl octynol, propargyl alcohol, hexynol, benzyl butynol, naphthyl butynol, and the like. Acetylenic alcohols having 3 to 10 carbon atoms are preferred.

Quaternary amine compounds comprise aromatic nitrogen compounds including alkyl pyridine-N-methyl chloride quaternary, alkyl pyridine-N-benzyl chloride quaternary, quinoline-N-methyl chloride quaternary, quinoline-N-benzyl chloride quaternary, quinoline-N-(chloro-benzyl chloride) quaternary, isoquinoline quaternaries, benzoquinoline quaternaries, chloromethyl naphthalene quaternaries and mixtures of such compounds, and the like. The quaternary amine compounds may also be coupled with a metal compound such as described in U.S. Pat. Nos. 5,002,673; 5,089,153; 5,130,034; 5,200,096; and 5,209,859, incorporated herein by reference.

Unsaturated aldehydes include, for example, those listed in U.S. Pat. No. 4,734,259 (Col. 3 and 4), and U.S. Pat. No. 5,013,483 (Col. 2, 3, and 4), incorporated herein by reference. A particularly preferred aldehyde is cinnamaldehyde.

Corrosion inhibiting amines include amines, amides, and imidazolines. Examples of amines include primary, secondary and tertiary alkyl amines; cyclic amines such as alkyl pyridines; crude quinolines; fatty polyamines such as tallow diamine; aromatic amines such as aniline; and derivatives of these amines. Examples of preferred amides include fatty acid polyamines such as tall oil fatty acid reacted with triethylene tetramine in a 1:1 mole ratio; tallow fatty acid reacted with tetraethylene penta amine in a 1:1 mole ratio or derivatives of this class of compounds. An example of an imidazoline ACI includes tall oil fatty acid reacted with triethylene tetramine (and derivatives thereof) such as those described in U.S. application Ser. No. 07/962,464 filed on Oct. 16, 1992, incorporated herein by reference.

Mannich reaction products of aromatic nitrogen compounds, monoamines and aldehydes are described in U.S. Pat. No. 4,871,848, incorporated herein by reference.

Organic solvents useable in the composition of this invention include organic liquids selected from polar aprotic solvents, aromatic solvents, terpinols, and alcohols. Representative aprotic solvents include N,N-dimethyl formamide (DMF), dimethylsulfoxide (DMSO), dimethylacetamide (DMA), 1-methyl-2-pyrrolidone ("pyrrolidone"), tetramethylene sulfone ("sulfolane"), acetone, formamide, acetonitrile, and the like. Aromatic solvents include heavy aromatic naptha, xylene, toluene, and others such as described in U.S. Pat. Nos. 4,498,997, 5,013,483 and 4,734,259. Alcohols include methanol, ethanol, propanol, isopropanol (IPA), 1-butanol, iso-butanol, tert-butanol, ethylene glycol, diethylene glycol, monobutyl ether of ethylene glycol, glycerine and the like.

In an embodiment, the solvents are selected from methanol, isopropanol, ethanol, 1-butanol, iso-butanol, tert-butanol, acetonitrile, N,N-dimethyl formamide, formamide, and acetone.

In an embodiment, the corrosion inhibitor composition further comprises one or more surfactants.

The surfactants serve to disperse the acid corrosion inhibitor in the acidic solution as well as to help wet the tubular goods to permit filming of the ACI. Suitable surfactants include nonionics having hydrophilic-lipophilic balance (HLB) numbers of 1 to 18, preferably 3 to 16 such as laureates, stearates, and oleates. Nonionic surfactants further include the polyoxyethylene surfactants, such as ethoxylated alkyl phenols and ethoxylated aliphatic alcohols, polyethylene glycol esters of fatty, resin, and tall oil acids and polyoxyethylene esters of fatty acids. Examples of such surfactants are polyoxyethylene alkyl phenol wherein the alkyl group is linear or branched $C_8$-$C_{12}$ and contains above about 60 weight percent poly oxyethylene. Octyl and nonyl phenols containing 9 to 15 moles ethylene oxide per mole hydrophobe are the preferred ethoxylated alkyl phenol surfactants. The polyoxyethylene esters of fatty acids include the mono and dioleates and sesquioleates wherein the molecular weight of the esterified polyethylene glycol is between about 200 and 1,000. In practice, the nonionic surfactants may be blended to provide the desired properties. A particularly useful surfactant is a blend of polyethylene glycol esters of fatty acids and ethoxylated alkylphenols.

Other useful surfactants include cationic amines, quaternary amines, amphoterics, anionic sulfates and anionic sulfonates.

In an embodiment, the corrosion inhibitor composition further comprises one or more dispersants.

In an embodiment, the corrosion inhibitor composition further comprises a co-extender such as a formic acid compound.

The formic acid compound may be selected from formic acid, formate esters and formamides. Representative formic acid compounds include formic acid, methyl formate, ethyl formate, benzyl formate, formamide, dimethyl formamide, formaniline, and the like and mixtures thereof.

In a typical preparation of the corrosion inhibitor composition of the invention, the iodide salt is added to the organic solvents and optional water. To this mixture is added any additional ingredients followed by any surfactants used. This entire mixture is then allowed to stir until all of the iodide salt is dissolved. Finally, all the corrosion inhibitor intermediates are added and the mixture is again stirred to ensure complete intermingling of all the ingredients to form the completed corrosion inhibitor composition.

It should be noted that the order of addition of ingredients can vary depending on the particular corrosion inhibitor composition although generally it is easier to dissolve the iodide salt before the addition of the corrosion inhibitor intermediates.

In an embodiment, the corrosion inhibitor composition comprises about 0.1 to about 60 weight percent solvents, about 0.1 to about 25 weight percent surfactants, about 0.1 to about 80 weight percent corrosion inhibitor intermediates and about 0.1 to about 20 weight percent iodide salts.

In another embodiment, the corrosion inhibitor composition comprises about 1 to about 50 weight percent solvents, about 1 to about 20 weight percent surfactants, about 10 to about 70 weight percent corrosion inhibitor intermediates and about 0.2 to about 10 weight percent iodide salts.

In another embodiment, the corrosion inhibitor composition comprises about 5 to about 45 weight percent solvents, about 5 to about 20 weight percent surfactants, about 20 to about 60 weight percent corrosion inhibitor intermediates and about 0.5 to about 5 weight percent iodide salts.

In another embodiment, the corrosion inhibitor composition comprises about 10 to about 40 weight percent solvents, about 10 to about 15 weight percent surfactants, about 30 to about 50 weight percent corrosion inhibitor intermediates and about 1 to about 2 weight percent iodide salts.

The corrosion inhibitor composition may be used with any well treating acids used in the oil field. Representative well treating acids include hydrochloric acid (HCl), hydrofluoric acid (HF), mixtures of HCl and HF (i.e. mud acid), acetic acid, formic acid, and other organic acids and anhydrides. The most common acids are 3% HCl, 7-½% HCl, 15% HCl, 28% HCl, and blends of HCl and HF (mud acid). Mud acid is typically a blend of 3 to 12% of HCl and 1 to 6% HF.

The corrosion inhibitor formulation is introduced into the well treating acid at a concentration sufficient to coat the well tubulars and equipment. The concentration of the acid corrosion inhibitor formulation in the acid solution should generally be sufficient to provide the acid solution with at least 0.001 weight percent of the iodide salt. The upper limit of the iodide salt will be controlled by economics. Generally speaking, from about 0.1 to 5 weight percent of the total acid corrosion inhibitor formulation in the acid solution will provide satisfactory protection for the well tubulars.

The concentration of the formulation in the well treating acid should be sufficient to provide protection to the metal (e.g. steel or chrome alloys) tubulars against corrosion. The concentration of the formulation will depend on the temperature of the well, the exposure time of the tubulars to the acid solution, the type of acid, and type of metal alloy. As mentioned above, the concentration of the ACI in the acid solution should be between 0.1 to 20 weight percent, preferably 0.1 to 10 weight percent and more preferably 0.1 to 5 weight percent.

The foregoing may be better understood by reference to the following examples, which are shown for purposes of illustration and are not intended to limit the scope of the invention.

EXAMPLE 1

Preparation of a Representative Corrosion Inhibitor Composition

An 8 oz glass jar is charged with 10.05 g of N,N-dimethylformamide, 12.35 g of isopropanol, and 1.00 g of ammonium iodide. This mixture is stirred until all the ammonium iodide is dissolved. To this mixture is added 1.08 g of ethyl octynol, 9.24 g of propargyl alcohol, and 16.33 g of surfactant. Again the contents are thoroughly mixed until mixture is uniform in appearance. To this mixture is then added 39.95 g of quaternary nitrogen compounds and 10.00 g of amine compounds. This mixture is then intimately mixed until uniform in appearance.

Representative corrosion inhibitor compositions are shown in Tables 1-4.

In the following tables, percentages are in weight percent based on the total weight of the ACI composition. Iodide salts A-H designate phenyltrimethylammonium iodide (A), (ethyl)triphenylphosphonium iodide (B), lithium iodide (C), tetrabutylammonium iodide (D), tetraethylammonium iodide (E), tetrapropylammonium iodide (F), tetramethylammonium iodide (G) and ammonium iodide (H). In Tables 1, 3 and 4, the iodide salt is present in an amount of one percent by weight. In Table 2, the iodide salt is present in an amount of two percent by weight.

TABLE 1

1% Iodide Containing ACI Formulations
Inhibitor A.X Series

| Inhibitor A.X | Quaternary Nitrogen Compounds | Ethyl Octynol | Propargyl Alcohol | DMF | Polyamines | Surfactant | IPA | Iodide salt |
|---|---|---|---|---|---|---|---|---|
| A.1 | 39.95 | 1.08% | 9.24% | 10.05% | 10.00% | 16.33% | 12.35% | A |
| A.2 | " | " | " | " | " | " | " | B |
| A.3 | " | " | " | " | " | " | " | C |
| A.4 | " | " | " | " | " | " | " | D |
| A.5 | " | " | " | " | " | " | " | E |
| A.6 | " | " | " | " | " | " | " | F |
| A.7 | " | " | " | " | " | " | " | G |
| A.8 | " | " | " | " | " | " | " | H |
| A.9 | " | " | " | " | " | " | 13.35% | |

TABLE 2

2% Iodide Containing ACI Formulations
Inhibitor B.X Series

| Inhibitor B.X | Quaternary Nitrogen Compounds | Ethyl Octynol | Propargyl Alcohol | DMF | Polyamines | Surfactant | IPA | Iodide salt |
|---|---|---|---|---|---|---|---|---|
| B.1 | 39.95 | 1.08% | 9.24% | 10.05% | 10.00% | 16.33% | 11.35% | A |
| B.2 | " | " | " | " | " | " | " | B |
| B.3 | " | " | " | " | " | " | " | C |
| B.4 | " | " | " | " | " | " | " | D |
| B.5 | " | " | " | " | " | " | " | E |
| B.6 | " | " | " | " | " | " | " | F |
| B.7 | " | " | " | " | " | " | " | G |
| B.8 | " | " | " | " | " | " | " | H |
| B.9 | " | " | " | " | " | " | 13.35% | |

TABLE 3

Methanol and 1% Iodide Containing ACI Formulations
Inhibitor C.X Series

| Inhibitor C.X | Quaternary Nitrogen Compounds | Mannich Reaction Product | Cinnamaldehyde | Formamide | Surfactant | Methanol | D.I. Water | Iodide salt |
|---|---|---|---|---|---|---|---|---|
| C.1 | 10.00% | 20.00% | 10.00% | 10.00% | 10.00% | 39.00% | | A |
| C.2 | " | " | " | " | " | " | | B |
| C.3 | " | " | " | " | " | " | | C |
| C.4 | " | " | " | " | " | " | | D |
| C.5 | " | " | " | " | " | " | | E |
| C.6 | " | " | " | " | " | " | | F |
| C.7 | " | " | " | " | " | " | | G |
| C.8 | " | " | " | " | " | " | | H |
| C.9 | " | " | " | " | " | 40.00% | | |

TABLE 4

Methanol/Water and 1% Iodide Containing Formulations
Inhibitor D.X Series

| Inhibitor D.X | Quaternary Nitrogen Compounds | Mannich Reaction Product | Cinnamaldehyde | Formamide | Surfactant | Methanol | D.I. Water | Iodide salt |
|---|---|---|---|---|---|---|---|---|
| D.1 | 10.00% | 20.00% | 10.00% | 10.00% | 10.00% | 20.00% | 19.00% | A |
| D.2 | " | " | " | " | " | " | " | B |
| D.3 | " | " | " | " | " | " | " | C |
| D.4 | " | " | " | " | " | " | " | D |
| D.5 | " | " | " | " | " | " | " | E |
| D.6 | " | " | " | " | " | " | " | F |
| D.7 | " | " | " | " | " | " | " | G |
| D.8 | " | " | " | " | " | " | " | H |
| D.9 | " | " | " | " | " | " | 20.00% | |

As shown in Tables 1-4, a variety of iodide salts may be suitably formulated into corrosion inhibitor compositions.

In addition to any performance benefits that the inclusion of an iodide salt may provide in an inhibitor formulation, the stability of the ACIs listed above is a critical factor in determining if an ACI formulation is successful. Because acid corrosion inhibitors contain complex mixtures of several compounds all in a balanced, stable formula the addition of any particular iodide compound could disrupt this stability by causing precipitation or separation of the ACI components or perhaps decreased ACI performance versus the non-iodide containing ACI. The stability of representative corrosion inhibitor compositions of the invention is shown in Tables 5 and 6.

TABLE 5

Iodide Salt Stability

| Inhibitor | Iodide Solubility | 72 Hour Precipitation | Layering | Notes |
|---|---|---|---|---|
| A.1 | Moderate | No | No | Iodide salt is initially difficult to dissolve. No precipitation or layering is evident. |
| A.2 | Moderate | " | " | Iodide salt is initially difficult to dissolve. No precipitation or layering is evident. |
| A.3 | Soluble | " | " | Iodide salt readily dissolves. No precipitation or layering is evident. |
| A.4 | Soluble | " | " | Iodide salt readily dissolves. No precipitation or layering is evident. |
| A.5 | Moderate | " | " | Iodide salt is initially difficult to dissolve. No precipitation or layering is evident. |
| A.6 | Moderate | " | " | Iodide salt is initially difficult to dissolve. No precipitation or layering is evident. |
| A.7 | Insoluble | Yes | " | Iodide salt did not dissolve even after stirring for 24 hours. No layering evident. |
| A.8 | Soluble | No | " | Iodide salt readily dissolves. No precipitation or layering is evident. |
| A.9 | N/A | " | " | Standard ACI formulation not inducing iodide salts. No layering evident. |
| B.1 | Moderate | No | No | Iodide salt is initially difficult to dissolve. No precipitation or layering is evident. |

TABLE 5-continued

Iodide Salt Stability

| Inhibitor | Iodide Solubility | 72 Hour Precipitation | Layering | Notes |
|---|---|---|---|---|
| B.2 | Moderate | " | " | Iodide salt is initially difficult to dissolve No precipitation or layering is evident. |
| B.3 | Soluble | " | " | Iodide salt readily dissolves. No precipitation or layering is evident. |
| B.4 | Soluble | " | " | Iodide salt readily dissolved. No precipitation or layering is evident. |
| B.5 | Moderate | Yes | " | Iodide salt is initially difficult to dissolve. Precipitation occurs after 24 hours. No layering is evident. |
| B.6 | Moderate | No | " | Iodide salt initially difficult to dissolve. No precipitation or layering is evident. |
| B.7 | Insoluble | Yes | " | Iodide salt would not dissolve even after stirring for 24 hours. No layering evident. |
| B.8 | Moderate | Yes | " | Iodide salt initially difficult to dissolve. Precipitation occurs after 24 hours. No layering evident. |

As Table 5 shows, representative iodide salts used in a 1 percent by weight concentration were soluble in the ACI formulations and showed no precipitation after 72 hours except for the ACI labeled A.7 containing tetramethylammonium iodide, which would not initially dissolve in the inhibitor formulation. When the amount of phenyltrimethylammonium iodide, (ethyl)triphenylphosphonium iodide, ammonium iodide, tetraethylammonium iodide, and tetrapropylammonium iodide are doubled, the ease in which they dissolve is decreased although they all dissolve over 2 hours. After 24 hours, a precipitate is evident in the corrosion inhibitors formulated with ammonium iodide and tetraethylammonium iodide.

TABLE 6

Iodide Salt Stability Chart

| Inhibitor | Iodide Soluble | 72 Hour Precipitation | Layering | Notes |
|---|---|---|---|---|
| C.1 | Soluble | No | No | Iodide salt is readily soluble. No precipitation or layering is evident. |
| C.2 | " | " | " | Iodide salt is readily soluble. No precipitation or layering is evident. |
| C.3 | " | " | " | Iodide salt is readily soluble. No precipitation or layering is evident. |
| C.4 | " | " | " | Iodide salt is readily soluble. No precipitation or layering is evident. |
| C.5 | " | " | " | Iodide salt is readily soluble No precipitation or layering is evident. |
| C.6 | " | " | " | Iodide salt is readily soluble. No precipitation or layering is evident. |
| C.7 | Insoluble | Yes | " | Iodide salt did not dissolve even after stirring for 24 hours. No layering evident. |
| C.8 | Soluble | No | " | Iodide salt is readily soluble. No precipitation or layering is evident. |
| C.9 | N/A | " | " | Standard ACI formulation without the use of any iodide salts. No layering evident. |
| D.1 | Soluble | No | No | Iodide salt is readily soluble. No precipitation or layering is evident. |
| D.2 | " | " | " | Iodide salt is readily soluble. No precipitation or layering is evident. |
| D.3 | " | " | " | Iodide salt is readily soluble. No precipitation or layering is evident. |
| D.4 | " | " | " | Iodide salt is readily soluble. No precipitation or layering is evident. |
| D.5 | " | " | " | Iodide salt is readily soluble. No precipitation or layering is evident. |
| D.6 | " | " | " | Iodide salt is readily soluble. No precipitation or layering is evident. |
| D.7 | Insoluble | Yes | " | Iodide salt did not dissolve even after stirring for 24 hours. No layering evident. |
| D.8 | Soluble | No | " | Iodide salt is readily soluble. No precipitation or layering is evident. |
| D.9 | N/A | " | " | Standard ACI formulation without the use of any iodide salts. No layering evident. |

Table 6 shows the stabilities of various iodide-containing ACIs that differ quite significantly in their formulations when compared to the ACIs in Table 5 (see Tables 1-4 for formulation differences). Representative iodide salts dissolve readily except for the tetramethylammonium iodide salt, which is insoluble. Furthermore, no apparent precipitate forms after 72 hours in these formulations and no layering of the corrosion inhibitor components is evident.

EXAMPLE 2

Corrosion Testing by Weight Loss

Corrosion rates are determined on different metal test coupons including N80, Cr13, and CT900 in a simulated treatment fluid made up from an aqueous mixture of hydrochloric acid or hydrochloric/hydrofluoric acid mixtures (HF generated in situ using ammonium bifluoride). Typically, 100 mL of the treatment fluid is used, to which is added the selected amount of acid corrosion inhibitor given in gallons per thousand (GPT). Any additional external intensifiers are then added to the treatment fluid. The selected test coupons are then added to the inhibited acid mixtures and these mixtures are then placed in a high temperature and pressure corrosion autoclave unit. These coupons remained in the autoclave under pressure for the test duration (typically 4 or 6 hours) at 3000 psi. After that the coupons are removed, cleaned and weighed to obtain their weight loss. The corrosion value is then given in lb/ft². The coupons are also visually inspected for any pitting corrosion and assigned a value of 0-7. Values 0-3 are considered acceptable rates while any value higher than that are not acceptable. The results are shown in Tables 7-12.

TABLE 7

275° F., 6 hours, 3000 psi, 20 GPT Inhibitor, 15% HCl

| Inhibitor A.X | Metal | Average Corrosion (lb/ft²) | Pitting Number | Pitting Description |
|---|---|---|---|---|
| A.1 | N80 | 0.0355 | 0 | General Corrosion |
| A.2 | " | 0.0349 | 0 | General Corrosion |
| A.3 | " | 0.0346 | 0 | General Corrosion |
| A.4 | " | 0.0370 | 0 | General Corrosion |
| A.5 | " | 0.0321 | 0 | General Corrosion |
| A.6 | " | 0.0399 | 0 | General Corrosion |
| A.8 | " | 0.0385 | 0 | General Corrosion |
| A.9 | " | 0.0444 | 0 | General Corrosion |
| A.1 | Cr13 | 0.0579 | 0 | General Corrosion |
| A.2 | " | 0.0664 | 2 | Slight Edge Pitting |
| A.3 | " | 0.0553 | 0 | General Corrosion |
| A.4 | " | 0.0655 | 0 | General Corrosion |
| A.5 | " | 0.0584 | 0 | General Corrosion |
| A.6 | " | 0.0737 | 0 | General Corrosion |
| A.8 | " | 0.0658 | 0 | General Corrosion |
| A.9 | " | 0.3763 | 7 | Extreme Surface Edge Corrosion |

TABLE 8

275° F., 6 hours, 3000 psi, 20 GPT Inhibitor, 15% HCl

| Inhibitor B.X | Metal | Average Corrosion (lb/ft²) | Pitting Number | Pitting Description |
|---|---|---|---|---|
| B.1 | N80 | 0.0252 | 0 | General Corrosion |
| B.2 | " | 0.0227 | 0 | General Corrosion |
| B.3 | " | 0.0229 | 0 | General Corrosion |
| B.4 | " | 0.0242 | 0 | General Corrosion |
| B.6 | " | 0.0245 | 0 | General Corrosion |
| B.9 | " | 0.0412 | 0 | General Corrosion |
| B.1 | Cr13 | 0.0495 | 1 | Very Slight Edge Pitting |
| B.2 | " | 0.0521 | 3 | Minor Surface/Edge Pitting |
| B.3 | " | 0.0484 | 0 | General Corrosion |
| B.4 | " | 0.0519 | 2 | Slight Edge Pitting |
| B.6 | " | 0.0518 | 1 | Very Slight Edge Pitting |
| B.9 | " | 0.4217 | 7 | Extreme Surface/Edge Corrosion |

TABLE 9

275° F., 6 hours, 3000 psi, 20 GPT Inhibitor, 15% HCl

| Inhibitor C.X | Metal | Average Corrosion (lb/ft2) | Pitting Number | Pitting Description |
|---|---|---|---|---|
| C.1 | N80 | 0.0292 | 3 | Minor Surface/Edge Pitting |
| C.2 | " | 0.0189 | 3 | General Corrosion |
| C.3 | " | 0.0180 | 0 | General Corrosion |
| C.4 | " | 0.0248 | 3 | Minor Surface/Edge Pitting |
| C.5 | " | 0.0320 | 5 | Significant Surface/Edge Pitting |
| C.6 | " | 0.0294 | 5 | General Corrosion |
| C.8 | " | 0.0327 | 4 | Surface/Edge Pitting |
| C.9 | " | 0.0678 | 5 | Significant Surface/Edge Pitting |
| C.1 | Cr13 | 0.1812 | 0 | General Corrosion |
| C.2 | " | 0.2374 | 0 | General Corrosion |
| C.3 | " | 0.0978 | 3 | Minor Surface/Edge Pitting |
| C.4 | " | 0.2231 | 0 | General Corrosion |
| C.5 | " | 0.1639 | 0 | General Corrosion |
| C.6 | " | 0.2797 | 0 | General Corrosion |
| C.8 | " | 0.1894 | 0 | General Corrosion |
| C.9 | " | 0.6530 | 5 | Significant Surface/Edge Pitting |

TABLE 10

275° F., 6 hours, 3000 psi, 20 GPT Inhibitor, 15% HCl

| Inhibitor D.X | Metal | Average Corrosion (lb/ft²) | Pitting Number | Pitting Description |
|---|---|---|---|---|
| D.1 | N80 | 0.0181 | 2 | Slight Edge Pitting |
| D.2 | " | 0.0272 | 3 | Minor Surface/Edge Pitting |
| D.3 | " | 0.0169 | 0 | General Corrosion |
| D.4 | " | 0.0210 | 3 | Minor Surface/Edge Pitting |
| D.5 | " | 0.0181 | 2 | Slight Edge Pitting |
| D.6 | " | 0.0198 | 0 | General Corrosion |
| D.8 | " | 0.0249 | 3 | Minor Surface/Edge Pitting |
| D.9 | " | 0.0422 | 3 | Minor Surface/Edge Pitting |
| D.1 | Cr13 | 0.0742 | 4 | Surface/Edge Pitting |
| D.2 | " | 0.1352 | 7 | Extreme Surface/Edge Corrosion |
| D.3 | " | 0.0574 | 4 | Surface/Edge Pitting |
| D.4 | " | 0.1150 | 7 | Extreme Surface/Edge Corrosion |
| D.5 | " | 0.0859 | 5 | Significant Surface/Edge Pitting |
| D.6 | " | 0.1539 | 7 | Extreme Surface/Edge Corrosion |

TABLE 10-continued

275° F., 6 hours, 3000 psi, 20 GPT Inhibitor, 15% HCl

| Inhibitor D.X | Metal | Average Corrosion (lb/ft²) | Pitting Number | Pitting Description |
|---|---|---|---|---|
| D.8 | " | 0.0835 | 7 | Extreme Surface/Edge Corrosion |
| D.9 | " | 0.5799 | 7 | Extreme Surface/Edge Corrosion |

The data in Tables 7-10 show that a soluble iodide source can be formulated into an acid corrosion inhibitor successfully while providing respectable corrosion protection. Changing solvent conditions in the ACI formulation or the cationic portion of the iodide salt can influence the solubility of the selected iodide source. Additionally, the utilization of as little as 1 percent by weight of an iodide salt can positively influence the corrosion protection provided by the ACI. This is shown when comparing the formulation of an ACI that was made with an iodide salt versus one that was not.

In order to further explore the capabilities of iodide-containing ACIs, a representative ACI, A.8, is selected to further investigate the corrosion protection capabilities of an iodide-containing ACI at higher temperature, with other metallurgies, and with the use of an additional external intensifier such as formic acid. These tests are carried out side by side with other commercially available ACIs for comparison purposes. Generic composition information is show in Table 11.

Table 12 shows the corrosion test results for representative ACI A.8. The corrosion testing is done at 250° F., 300° F., and 350° F. with both N80 and CT900 coupons. Table 13 shows the corrosion data acquired for the ACI labeled A.8 at 250° F., 300° F., and 350° F. with Cr13 coupons. In both Tables 12 and 13, the data are collected alongside the commercially available ACI data for comparison purposes.

TABLE 11

Composition of Commercially Available ACIs

| Label | Solvents | Surfactants | Amine Materials | Ammonium Iodide | Other* |
|---|---|---|---|---|---|
| Commercial A | 59.5 | 5 | 25.6 | 0 | 9.9 |
| Commercial B | 58.5 | 8 | 25.6 | 0 | 7.9 |
| Commercial C | 6 | 20 | 20 | 0 | 54 |
| Commercial D | 15.3 | 16.3 | 54 | 0 | 14.4 |
| Inhibitor A.8 | 22.4 | 16.3 | 50 | 1 | 10.3 |

*Includes, but is not limited to, acetylenic alcohols, α,β-unsaturated aldehydes, organic acids, and transition metal salts

TABLE 12

Corrosion Inhibition Data at 3000 psi & 10 GPT of Inhibitor

| ACI | Time (hours) | Temp (° F.) | % HCl | Formic Acid (GPT) | Metal | Average Corrosion (lb/ft²) | Pitting Number | Pitting Description |
|---|---|---|---|---|---|---|---|---|
| Commercial A | 6 | 250 | 28 | 20 | N80 | 0.0113 | 0 | General Corrosion |
| Commercial B | " | " | " | " | " | 0.0099 | 0 | General Corrosion |
| Commercial C | " | " | " | " | " | 0.0156 | 0 | General Corrosion |
| Commercial D | " | " | " | " | " | 0.0092 | 0 | General Corrosion |
| Inhibitor A.8 | " | " | " | " | " | 0.0103 | 0 | General Corrosion |
| Commercial A | 6 | 250 | 28 | 20 | CT900 | 0.0106 | 0 | General Corrosion |
| Commercial B | " | " | " | " | " | 0.0082 | 0 | General Corrosion |
| Commercial C | " | " | " | " | " | 0.0133 | 0 | General Corrosion |
| Commercial D | " | " | " | " | " | 0.0084 | 0 | General Corrosion |
| Inhibitor A.8 | " | " | " | " | " | 0.0102 | 0 | General Corrosion |
| Commercial A | 6 | 300 | 28 | 40 | N80 | 0.0374 | 0 | General Corrosion |
| Commercial B | " | " | " | " | " | 0.0394 | 0 | General Corrosion |
| Commercial C | " | " | " | " | " | 0.0481 | 0 | General Corrosion |
| Commercial D | " | " | " | " | " | 0.0327 | 0 | General Corrosion |
| Inhibitor A.8 | " | " | " | " | " | 0.0303 | 0 | General Corrosion |
| Commercial A | 6 | 300 | 28 | 40 | CT900 | 0.0459 | 0 | General Corrosion |
| Commercial B | " | " | " | " | " | 0.0409 | 0 | General Corrosion |
| Commercial C | " | " | " | " | " | 0.0554 | 0 | General Corrosion |
| Commercial D | " | " | " | " | " | 0.0382 | 0 | General Corrosion |
| Inhibitor A.8 | " | " | " | " | " | 0.0369 | 0 | General Corrosion |
| Commercial C | 4 | 350 | 15 | 60 | N80 | 0.0445 | 0 | General Corrosion |
| Commercial D | " | " | " | " | " | 0.0436 | 0 | General Corrosion |
| Inhibitor A.8 | " | " | " | " | " | 0.0372 | 0 | General Corrosion |
| Commercial C | 4 | 350 | 15 | 60 | CT900 | 0.0536 | 0 | General Corrosion |
| Commercial D | " | " | " | " | " | 0.0432 | 0 | General Corrosion |
| Inhibitor A.8 | " | " | " | " | " | 0.0415 | 0 | General Corrosion |

TABLE 13

Corrosion Inhibitor Data at 3000 psi Using Cr13

| ACI | ACI (GPT) | Time (hours) | Temp (F.) | % HCl | GPT Formic Acid | Average Corrosion (lb/ft$^2$) | Pitting Number | Pitting Description |
|---|---|---|---|---|---|---|---|---|
| Commercial D | 10 | 6 | 250 | 28 | 20 | 0.0132 | 0 | General Corrosion |
| Inhibitor A.8 | " | " | " | " | " | 0.0169 | 0 | General Corrosion |
| Commercial D | 15 | 6 | 300 | 28 | 40 | 0.0573 | 0 | General Corrosion |
| Inhibitor A.8 | 10 | " | " | " | " | 0.0484 | 0 | General Corrosion |
| Commercial D | 20 | 4 | 350 | 15 | 60 | 0.0600 | 0 | General Corrosion |
| Inhibitor A.8 | " | " | " | " | " | 0.0589 | 0 | General Corrosion |

The results from Tables 12 and 13 suggest that representative ACI A.8 works very well with formic acid as an external intensifier at a variety of temperatures and with several different metals. This ACI provides corrosion inhibition that is nearly the same, or in some cases better than, other commercially available ACIs.

Changes can be made in the composition, operation, and arrangement of the method of the invention described herein without departing from the concept and scope of the invention as defined in the claims.

The invention claimed is:

1. A corrosion inhibitor composition comprising
   (a) from at least 20 weight percent to about 60 weight percent of one or more organic solvents, wherein the organic solvent is selected from the group consisting of: isopropanol, methanol, ethanol, 1-butanol, iso-butanol, tert-butanol, acetonitrile, dimethylformamide, formamide, acetonitrile, acetone, and combinations thereof;
   (b) one or more corrosion inhibitor intermediates; and
   (c) about 0.1 to about 20 weight percent of one or more iodide salts dissolved in said composition; wherein said composition excludes added acid and is resistant to precipitate formation or separation and wherein the composition is uniform in appearance.

2. The corrosion inhibitor composition of claim 1 wherein said iodide salts are selected from lithium iodide, sodium iodide, potassium iodide, calcium iodide, magnesium iodide, ammonium iodide, tetmethylammonium iodide, tetrapropylammonium iodide, tetrabutylammonium iodide, tetrapentylammonium iodide, tetrahexylammonium iodide, tetraheptylammonium iodide, tetraphenylammonium iodide, phenytrimethylammonium iodide and (ethyl)triphenylphosphonium iodide.

3. The corrosion inhibitor composition of claim 1 wherein said corrosion inhibitor intermediates are selected from the group consisting of acetylenic alcohols; quaternary ammonium compounds, α,β-unsaturated aldehydes, amines and Mannich reaction products.

4. The corrosion inhibitor composition of claim 3 further comprising one or more surfactants.

5. The corrosion inhibitor composition of claim 3 further comprising one or more dispersants.

6. The corrosion inhibitor composition of claim 1 comprising about 0.2 to about 10 weight percent iodide salts.

7. The corrosion inhibitor composition of claim 6 wherein said iodide salts are selected from the group consisting of lithium, iodide, phenyltrimethylammonium iodide, (ethyl) triphenylphosphonium iodide, tetrabutylammonium iodide, tetraethylammonium iodide, tetrapropylammonium iodide and ammonium iodide.

8. The corrosion inhibitor composition of claim 7 comprising about 0.5 to about 5 weight percent of said iodide salts.

9. The corrosion inhibitor composition of claim 8 wherein the iodide salt is ammonium iodide.

10. The corrosion inhibitor composition of claim 9 comprising about 1 to about 2 weight percent ammonium iodide.

11. A method of protecting against corrosion of metallic surfaces, the method comprising introducing the composition of claim 1 into a well at a concentration sufficient to coat well tubulars and equipment.

12. A corrosion inhibitor composition consisting of
   (a) one or more organic solvents selected from the group consisting of: isopropanol, methanol, ethanol, 1-butanol, iso-butanol, tert-butanol, acetonitrile, dimethylformamide, formamide, acetonitrile, acetone, and combinations thereof;
   (b) one or more corrosion inhibitor intermediates;
   (c) one or more dispersants and/or surfactants;
   (d) about 0.1 to about 20 weight percent of one or more iodide salts dissolved in said composition; and
   (e) optionally water, wherein said composition excludes added acid and is resistant to precipitate formation or separation and wherein the composition is uniform in appearance.

13. The corrosion inhibitor composition of claim 12 wherein said iodide salts are selected from lithium iodide, sodium iodide, potassium iodide, calcium iodide, magnesium iodide, ammonium iodide, tetraethylammonium iodide, tetrapropylammonium iodide, tetrabutylammonium iodide, tetrapentylammonium iodide, tetrahexylammonium iodide, tetraheptylammonium iodide, tetraphenylammonium iodide, phenytrimethylammonium iodide and (ethyl)triphenylphosphonium iodide.

14. The corrosion inhibitor composition of claim 13 wherein said corrosion inhibitor intermediates are selected from the group consisting of acetylenic alcohols; quaternary ammonium compounds, α,β-unsaturated aldehydes, amines and Mannich reaction products.

15. The corrosion inhibitor composition of claim 12, wherein the one or more iodide salts are present in an amount from about 0.2 to about 10 weight percent.

16. The corrosion inhibitor composition of claim 15 wherein said iodide salts are selected from the group consisting of lithium iodide, phenyltrimethylammonium iodide, (ethyl)triphenylphosphonium iodide, tetrabutylammonium iodide, tetraethylammonium iodide, tetrapropylammonium iodide and ammonium iodide.

17. The corrosion inhibitor composition of claim 16, wherein the one or more iodide salts are present in an amount from about 0.5 to about 5 weight percent.

18. The corrosion inhibitor composition of claim 17 wherein the iodide salt is ammonium iodide.

19. The corrosion inhibitor composition of claim 18, wherein the ammonium iodide is present in an amount from about 1 to about 2 weight percent.

\* \* \* \* \*